United States Patent [19]

Farr

[11] Patent Number: 4,548,037
[45] Date of Patent: Oct. 22, 1985

[54] HYDRAULIC POWER BOOSTERS FOR VEHICLES BRAKING SYSTEMS

[75] Inventor: Glyn P. R. Farr, Warwickshire, England

[73] Assignee: Girling Limited, Birmingham, England

[21] Appl. No.: 520,757

[22] Filed: Aug. 8, 1983

Related U.S. Application Data

[63] Continuation of Ser. No. 263,257, May 13, 1981, abandoned, which is a continuation of Ser. No. 937,707, Aug. 29, 1978, abandoned.

[30] Foreign Application Priority Data

Sep. 1, 1977 [GB] United Kingdom ................ 7736466

[51] Int. Cl.⁴ ............................................. B60T 13/20
[52] U.S. Cl. .................... 60/552; 91/369 A; 91/369 B
[58] Field of Search ...................... 60/547 R, 548, 552, 60/553, 554; 91/369 A, 369 B, 370

[56] References Cited

U.S. PATENT DOCUMENTS

| 2,807,239 | 9/1957 | Grant | 91/369 A |
| 3,110,031 | 11/1963 | Price | 60/554 |
| 3,152,449 | 10/1964 | Schultz | 91/369 A |
| 3,490,231 | 1/1970 | Klein | 60/554 |
| 3,548,595 | 12/1970 | Pech | 91/369 A |
| 3,712,177 | 1/1973 | Bach | 91/369 A |
| 3,937,127 | 2/1976 | Baker | 60/553 |
| 3,958,235 | 5/1976 | Hayashida | 60/553 |
| 4,014,171 | 3/1977 | Kobashi | 91/376 R |

FOREIGN PATENT DOCUMENTS 1165436 10/1969 United Kingdom ............ 91/369 A

Primary Examiner—Abraham Hershkovitz
Attorney, Agent, or Firm—Scrivener Clarke Scrivener and Johnson

[57] ABSTRACT

In an hydraulic booster a load applied to a master cylinder assembly through the booster is fed back to a pedal-operated input piston through a reducer mechanism. This provides, when a booster chamber for operating a boost piston is pressurized by boost pressure, a reaction of "feel" at the pedal which is unaffected by the magnitude of the boost pressure.

9 Claims, 6 Drawing Figures

HYDRAULIC POWER BOOSTERS FOR VEHICLES BRAKING SYSTEMS

This application is a continuation of application Ser. No. 263,257, filed May 13, 1981, now abandoned, which is a continuation of Ser. No. 937,707, filed Aug. 29, 1978, now abandoned.

SPECIFIC DESCRIPTION

This invention relates to hydraulic boosters for vehicle braking systems, the boosters being of the kind in which a boost piston working in a bore in a housing is adapted to provide a boost pressure to actuate a master cylinder assembly, and the housing is provided with a boost chamber for subjecting the boost piston to hydraulic pressure, the housing also being provided with an inlet port for connection to a source of high pressure hydraulic fluid and an exhaust port for connection to a reservoir for hydraulic fluid, and communication between the inlet port and the chamber and between the chamber and the exhaust port is controlled by a control valve responsive to an input load applied to a pedal operating an input piston.

In some known boosters of the kind set forth the boost pressure reacts directly on the pedal-operated input piston to provide a reaction or "feel" at the pedal. This produces large hysterisis effects with the pedal reaction, and thus the necessary pedal effort, varying with the magnitude of the boost pressure. It is known to reduce such hysterisis in boosters of the kind set forth by reducing the number of seals to a minimum and providing a stationary control valve or feeding the high pressure fluid to the system by a moving hose.

According to the present invention in a booster of the kind set forth, the load applied to the master cylinder assembly through the booster is fed back to the pedal-operated input piston through a reducer mechanism to provide, when the boost chamber is pressurised, a reaction or "feel" at the pedal which is unaffected by the magnitude of the boost pressure.

Thus the booster is "output reactive" and the operator will be unaware of the magnitude of the boost pressure and any variations in booster pressure due to seal hysterisis will not be felt at the pedal. Although the hysterisis of the booster may be high, the apparent hysterisis at the pedal will be relatively small.

The control valve is preferably housed in the boost piston and the input piston is adapted to act on one end of the control valve, the reducer mechanism being located between the opposite end of the control valve and an output rod for actuating the master cylinder assembly. Thus a reduction of the reaction on the output rod is fed back to the pedal through the control valve and the input piston.

The control valve may be slidably mounted in an axial through bore in the boost piston.

The reducer mechanism may comprise a deformable plug, for example of rubber, or a lever or ball ramp reducer. Alternatively the reducer mechanism may comprise a volume of hydraulic fluid trapped in a chamber between adjacent ends of the control valve and output member.

Two embodiments of the invention are illustrated in the accompanying drawings, in which.

Figure 1:
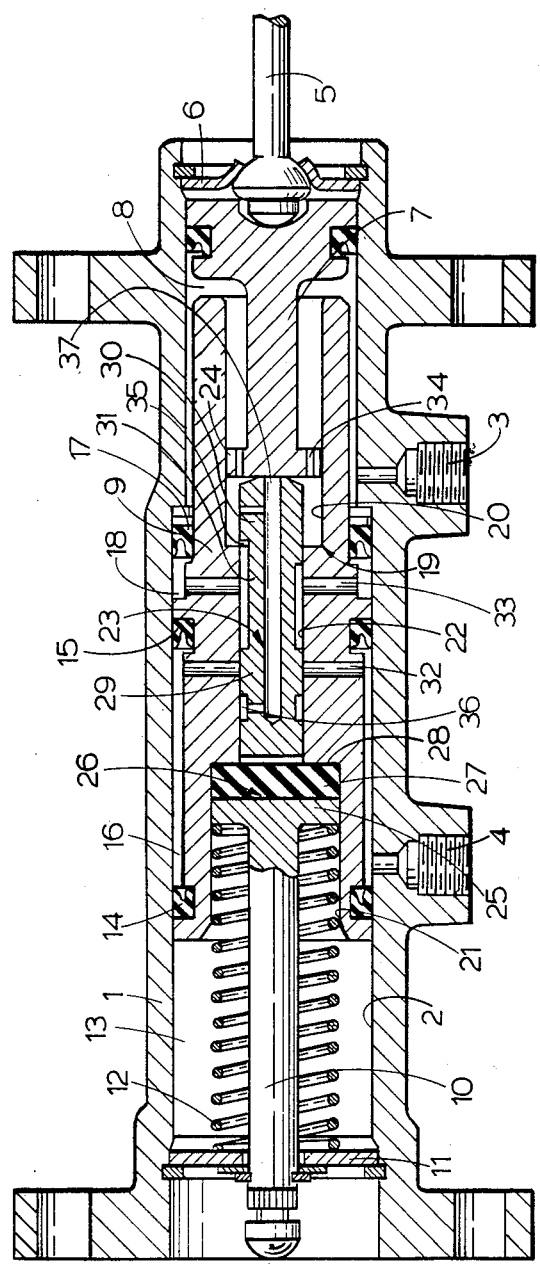
FIG. 1 is a longitudinal section through an hydraulic booster for a vehicle hydraulic braking system.

In the hydraulic booster illustrated in FIG. 1 of the drawings a housing 1 incorporating the booster assembly has a longitudinally extending bore 2 provided with an exhaust port 3 for connection to a reservoir for hydraulic fluid (not shown) and an inlet port 4 for connection to a source of hydraulic fluid under pressure, such as an accumulator. A pedal operated input member 5 works through an annular abutment 6 at one end of the bore 2 and acts on an input piston 7 working in the bore 2. A reservoir chamber 8 is defined in the portion of the bore 2 in which the reservoir port 3 is located being disposed between the input piston 7 and the inner end of a boost piston 9 working in the bore 2. The boost piston 9 acts at its opposite outer end on an output rod 10 which extends through an annular plate 11 at the other end of the bore 2. The output rod 10 is coupled to a master cylinder (not shown) for actuating the brakes of a vehicle. A return spring 12 for the boost piston 9 abuts between the annular plate 11 and the rod 10 and is housed in a chamber 13 at the forward end of the bore 2 which is connected to atmosphere. The boost piston 9 is of stepped outline to define in the bore 2, between spaced seals 14 and 15 on a portion of greater diameter, a first annular chamber 16 in which the inlet port 4 is located in the bore 2; and between the seal 15 and a portion of smaller diameter working through a fixed seal 17, a second annular boost chamber 18. The boost piston 9 has a stepped through bore 19 comprising larger diameter bore portions 20 and 21 at opposite ends of the bore 19 which are interconnected by an intermediate portion 22 of reduced diameter.

A control valve 23 is located in the bore portion 22 and extends into the bore portion 20 where it abuts a head 24 of increased diameter on the input piston 7. The head 24 works in the bore portion 20. The output rod 10 has an enlarged head 25 at its inner end. The head 25 works in the bore portion 21 and acts on the other end of the control valve 23 through a reducer mechanism 26 comprising a deformable plug 27, suitably of rubber which is housed in the bore 21 and engages over a peripheral edge portion with a shoulder 28 between the bore portions 18, 19. The return spring 12 acts on the head 25 to urge the plug 27 against the shoulder 28 and the control valve 23. The control valve 23 comprises a stepped diameter spool having spaced land 29, 30 connected by a reduced diameter stem 31. The land 29 acts as an inlet valve controlling communciation between the first chamber 16 and the boost chamber 18 by way of respective radial ports 32, 33 in the boost piston 9. The land 30 comprises an exhaust valve controlling communication between the reservoir chamber 8 and the boost chamber 18 by way of axial ports 34 in the input piston head 24, a gap 35 and the radial ports 33.

In the inoperative position in FIG. 1 the inlet valve is in its closed position and the exhaust valve is in its open position. Specifically the ports 32 are closed by the land 29 which also closes a radial recuperation port 36 in the valve spool, which is connected to the reservoir chamber 8 through an axial passageway 37 in the spool. In addition the control valve 23 is spaced by a small distance from the plug 77 to establish a clearance equal to, or slightly greater than, the length of the gap 35.

When the brake pedal is depressed to actuate the booster the input piston 7 is moved inwardly into the housing 1 and moves the control piston 23 in the same direction. Initially the land 30 moves into the bore portion 22 to close the gap 35 and isolate the boost chamber 18 from the reservoir chamber 8 before the control valve 23 can engage with the plug 27. Subsequently the land 29 moves past the radial ports 32 to connect the first chamber 16 to the boost chamber 18. Pressurised fluid from the accumulator is then supplied to the boost chamber 18 to act on the adjacent annular face of the boost piston 9. This moves the boost piston 9 inwardly once friction in the seals 14, 15, 17 and the load in the return spring 12 are overcome. The boost pressure is subsequently applied to the master cylinder through the output rod 10 and the reducer mechanism 26.

The reaction of the load applied to the master cylinder acts in a reverse direction and is transmitted through the output rod 10 to the resilient plug 27.

This deforms the plug 27 against the control valve 23. Thus a reduction of the load applied to the master cylinder is fed back to the brake pedal through the control valve 23, the input piston 7 which engages with the spool, and the input member 5, to provide a reaction or "feel". When the load on the control valve 23 equals the applied load at the pedal the control valve moves rearwardly until the inlet valve closes. In this position the booster is in its null position with both the inlet and exhaust valves closed. If the input force is reduced the resilient plug 27 deforms under the influence of the reaction of the land to urge the control valve 23 rearwardly through a further distance. This opens or re-establishes to re-connect the boost chamber 18 to the reservoir.

In this arrangement the operator will be unaware of the magnitude of the boost pressure as the reaction felt at the pedal is a reduction of the load applied to the master cylinder assemlby through the output rod 10. Thus variations in the boost pressure due to seal hysterisis are not felt at the pedal, and the apparent hysterisis is low.

In the event of failure of the boost pressure supply the control valve 23 after taking up the clearance, abuts the resilient plug 27 and, after a small displacement, the input load is transmitted directly to the output rod 10.

If the resilient plug 27 is of rubber it will act as a solid, non-deformable plug at extremely low temperatures of about −40° C. The booster is designed such that in the event of a brake application under these conditions the inlet valve is closed when the control valve 23 abuts the plug 27. Thus in this case when the control valve 23 is moved inwardly to open the inlet valve, the boost piston 9 also immediately moves in the same direction to close the inlet valve. As the input force cannot deform the rubber to open the valve, the master cylinder is applied without booster assistance. As the pedal is cycled the rubber will warm up and become operational again.

In a modification a lever reducer or, ball and ramp may be used as the reducer mechanism 26 in place of the resilient plug 27 to eliminate this effect.

Figure 2:
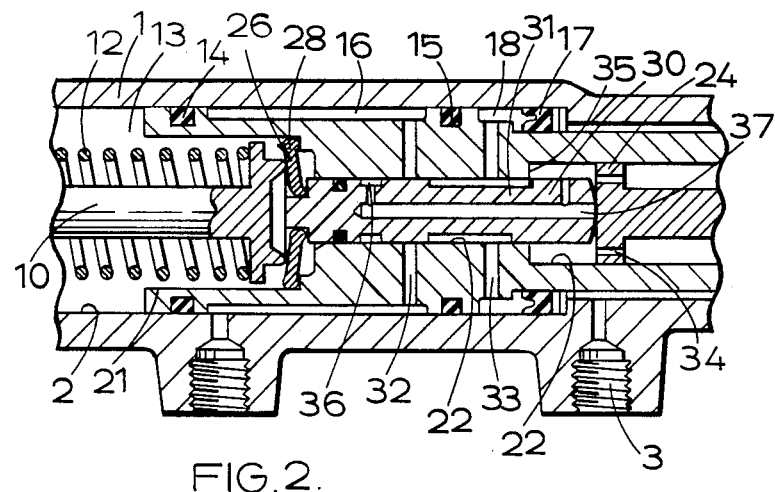
FIG. 2 is a longitudinal section through a portion of the booster of FIG. 1 but showing a modification.

As illustrated in FIG. 2 of the accompanying drawings the reducer mechanism 26 comprises a lever assembly 28.

The construction and operation of the booster of FIG. 2 is otherwise the same as that of FIG. 1 and corresponding reference numerals have been applied to corresponding parts.

Figure 3:
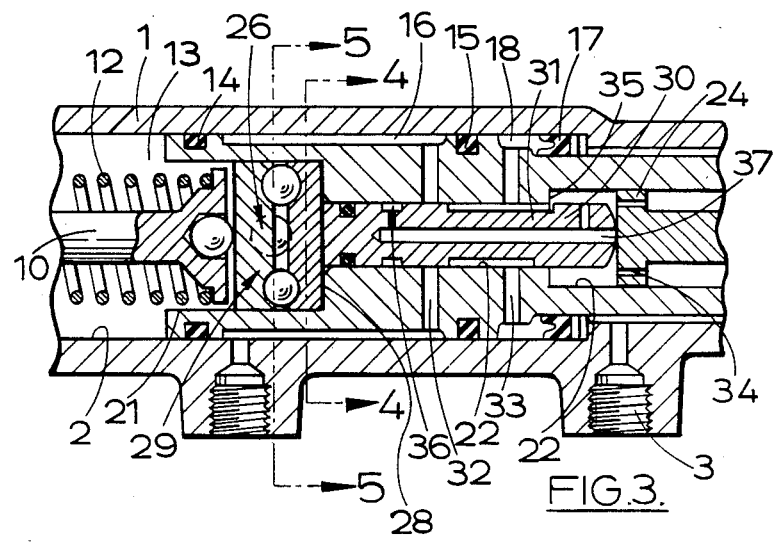
FIG. 3 is another longitudinal section through a portion of the booster of FIG. 1 but showing a modification.
Figure 4:
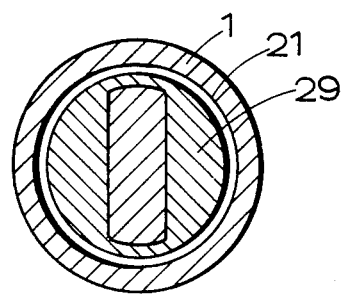
FIG. 4 is a section on the line 4—4 of FIG. 3.
Figure 5:
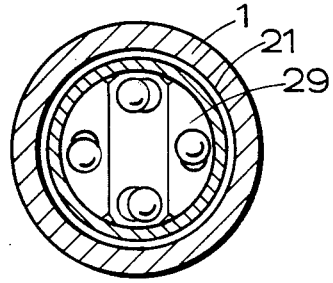
FIG. 5 is a section on the line 5—5 of FIG. 3.

In the booster illustrated in FIGS. 3 to 5 of the accompanying drawings the reducer mechanism 26 comprises a ball and ramp assembly 29.

Again the construction and operation of the booster of FIGS. 3 to 5 is otherwise the same as that of FIG. 1 and corresponding reference numerals have been applied to corresponding parts.

Figure 6:
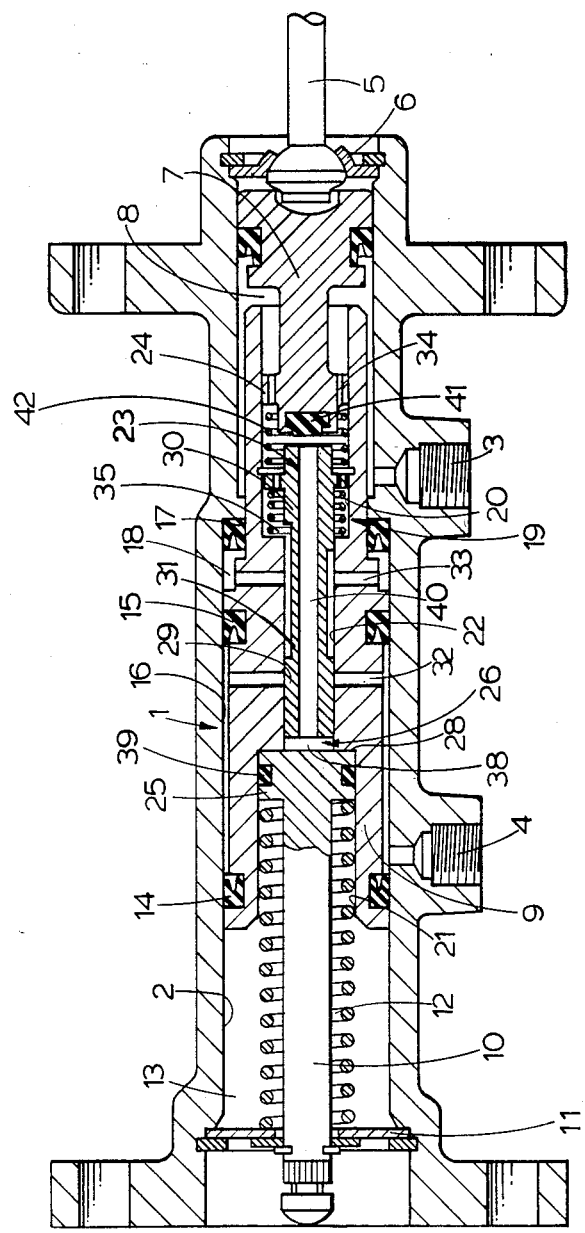
FIG. 6 is a longitudinal section through a modified booster.

A modified booster is illustrated in FIG. 6 in which corresponding reference numerals have been used for parts corresponding to those in the booster of FIG. 1. In this embodiment the reducer mechanism 26 comprises a volume of hydraulic fluid trapped in a chamber 38° which is defined between the spool 23 and the output rod 10, and the head 25 carries a seal 39 which works in the bore portion 21. The chamber 38 is recuperated to the reservoir through a through passage 40 in the control valve 23 and the axial passages 34 in the head 24 of the input piston 7. The head 24 carries a valve seal 41 for sealing engagement with an adjacent end of the control valve 23 to define a trap valve.

When the brake pedal is depressed the input piston 7 moves to engage the spool 23 and close the passage 40 against the loading in a return spring 42. The chamber 38 is then isolated. When the control valve 20 is moved inwardly to close the exhaust valve and open the inlet valve, pressurised fluid is supplied to the boost chamber 18 to act on the boost piston 9 and, eventually, the boost piston 9 is moved in the same direction to transmit a boost force to the master cylinder through output rod 10, as described above. The fluid trapped in the chamber 38 is then displaced and the resultant pressure acting on the spool 23 provides a reaction or "feel" at the pedal which is a reduction of the load applied to the output rod 10. The magnitude of the reaction is unaffected by the magnitude of the boost pressure.

The construction and operation of this embodiment is otherwise the same as that of FIG. 1, but the operation of the reducer mechanism is not affected by cold temperatures.

I claim:

1. An hydraulic booster for a vehicle braking system comprising a housing having a bore, an inlet port for connection to a source of high pressure hydraulic fluid, and an exhaust port for connection to a reservoir for hydraulic fluid, means in said housing defining a reservoir chamber in communication with said exhaust port, means in said housing defining a booster chamber, a boost piston working in said bore and responsive to a boost pressure in said boost chamber to actuate a master cylinder assembly, an output member through which said boost piston acts to actuate said master cylinder assembly, a pedal, an input piston-operated by said pedal and exposed at all times to said reservoir chamber, a control valve responsive to an input load applied to said pedal for controlling communication between said inlet port and said booster chamber, and between said booster chamber and said exhaust port, and a reducer mechanism disposed between said control valve and said output member and through which load applied to said master cylinder assembly is fed back to said input piston, said control valve itself constituting thrust transmitting means through which said load is transmitted from said reducer mechanism to said input piston without the provision of additional transmission means, separate from, and independent of, said control valve, whereby said reducer mechanism is adapted to provide, when said booster is operated by said pedal, a reaction or "feel" at said pedal which is unaffected by the magnitude of said boost pressure.

2. A booster as claimed in claim 1, wherein said control valve is housed in said boost piston and said input piston is adapted to act on one end of said control valve, said control valve comprising a spool for controlling communication between passages in said boost piston.

3. An hydraulic booster for a vehicle braking system comprising a housing having a bore, an inlet port for connection to a source of high pressure hydraulic fluid, and an exhaust port for connection to a reservoir for hydraulic fluid, means in said housing defining a high pressure chamber in communication with said inlet port, means in said housing defining a reservoir chamber in communication with said exhaust port, means in said housing defining a boost chamber, a boost piston working in said housing bore and being responsive to a boost pressure in said boost chamber to actuate a master cylinder assembly, an output rod through which said boost piston acts to actuate said cylinder assembly, a pedal, an input piston operated by said pedal and exposed at all times to said reservoir chamber, a bore in said boost piston, a control valve responsive to an effort applied to said input piston for controlling communication between said high pressure chamber and said boost chamber, and between said boost chamber and said reservoir chamber, and a reducer mechanism disposed between said control valve and said output rod said control valve comprising a valve spool which works through said bore in said boost piston for controlling communication between passages in said boost piston and through which load applied to said master cylinder assembly is fed through said reducer back to said input piston, said valve spool itself constituting thrust transmitting means through which said load is transmitted to said input piston without the provision of additional transmission means, separate from, and independent of, said control valve, whereby to provide, when said booster is operated by said pedal, a reaction or "feel" at said pedal, said output rod having an enlarged head which works in an enlarged portion of said booster piston bore which is of increased diameter, and said reducer mechanism being housed in a chamber defined in said bore between said head of said rod and the adjacent end of said spool.

4. An hydraulic booster for a vehicle braking system comprising a housing having a bore, an inlet port for connection to a source of high pressure hydraulic fluid, and an exhaust port for connection to a reservoir for hydraulic fluid, means in said housing defining a reservoir chamber in communication with said exhaust port, means in said housing defining a booster chamber, a boost piston working in said bore and responsive to a boost pressure in said boost chamber to actuate a master cylinder assembly, an output member through which said boost piston acts to actuate said master cylinder assembly, a pedal, an input piston operated by said pedal and exposed at all times to said reservoir chamber, a control valve responsive to an input load applied to said pedal for controlling communication between said inlet port and said booster chamber, and between said booster chamber and said exhaust port, and a reducer mechanism disposed between said control valve and said output member and through which load applied to said master cylinder assembly is fed back to said input piston, said control valve itself constituting thrust transmitting means through which said load is transmitted from said reducer mechanism to said input piston without the provision of additional transmission means, separate from, and independent of, said control valve, whereby said reducer mechanism is adapted to provide, when said booster is operated by said pedal a reaction or "feel" at said pedal which is unaffected by the magnitude of said boost pressure, said boost piston having a bore and said control valve comprising a spool working through said bore in said boost piston, said input piston being adapted to act on one end of said control valve, said reducer mechanism being located between the opposite end of said control valve and said output member comprising an output rod for actuating the master cylinder assembly, said output rod having an enlarged head which works in an enlarged portion of said bore which is of increased diameter, said reducer mechanism being housed in a reducer chamber defined in said bore between said head of said rod and the adjacent end of said spool.

5. A booster as claimed in claim 4, wherein said reducer mechanism comprises a deformable plug which is housed in said enlarged portion of said bore and is located between said head of said rod and a shoulder at a step in diameter between said bore and said enlarged portion.

6. A booster as claimed in claim 5, wherein said plug is of rubber.

7. A booster as claimed in claim 4, wherein said reducer mechanism comprises a lever reducer.

8. A booster as claimed in claim 4, wherein said reducer mechanism comprises a ball and a ramp reducer.

9. A booster as claimed in claim 4, wherein said head is sealingly guided in said enlarged portion, and said reducer chamber communicates with said reservoir through a longitudinally extending through passage in said spool and a trap valve comprising a valve head on said input piston, and a seating at the adjacent end of said spool which surrounds said passage, said valve head normally being spaced from said seating but engageable therewith when said booster is operated, whereby a volume of fluid which defines the reducer mechanism is trapped in said reducer chamber.

* * * * *